UNITED STATES PATENT OFFICE.

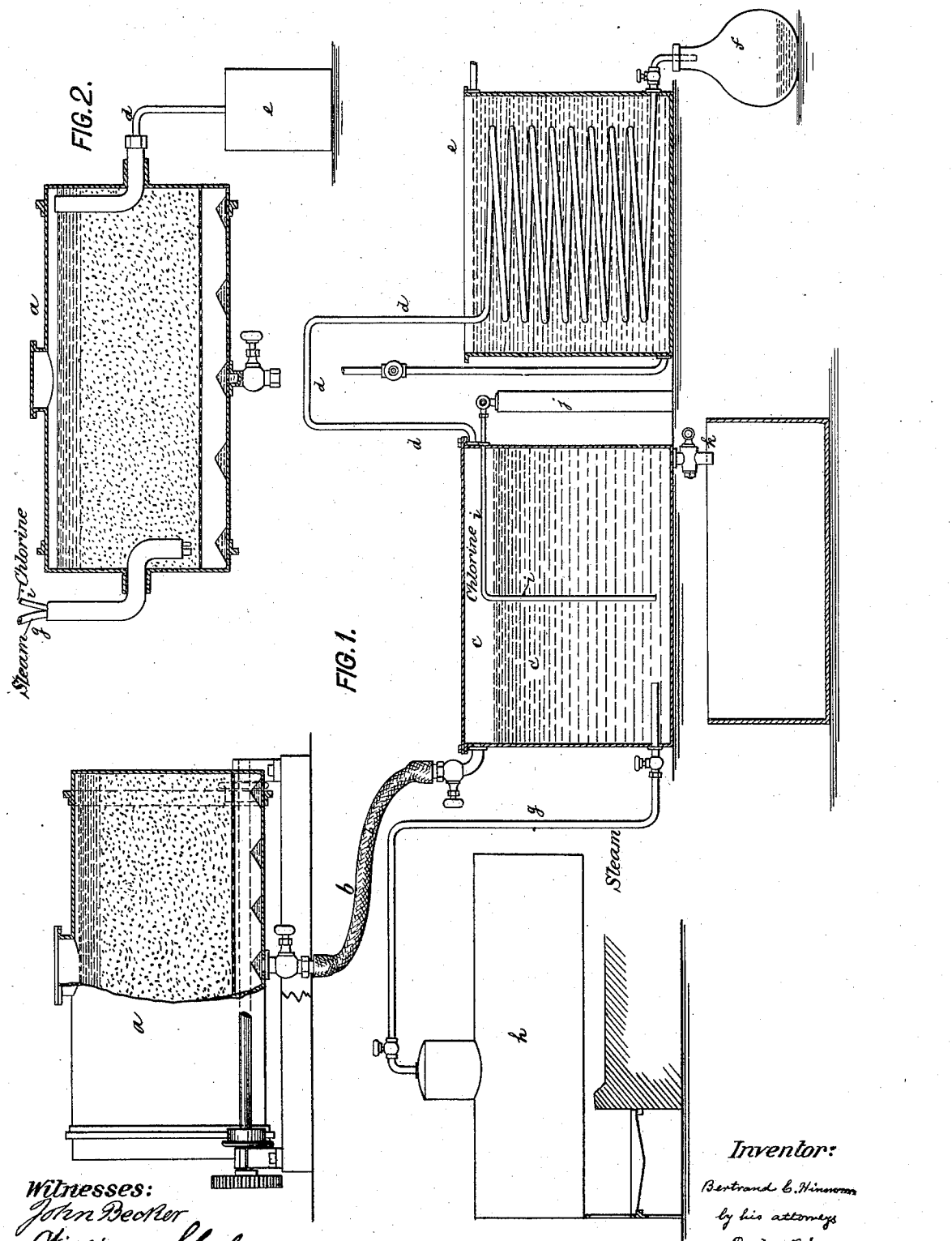

BERTRAND C. HINMAN, OF BROOKLYN, NEW YORK, ASSIGNOR TO THE GOLD AND BROMINE SEPARATING COMPANY, OF WEST VIRGINIA.

PROCESS OF EXTRACTING GOLD.

SPECIFICATION forming part of Letters Patent No. 545,890, dated September 10, 1895.

Application filed January 25, 1895. Serial No. 536,209. (No specimens.)

*To all whom it may concern:*

Be it known that I, BERTRAND C. HINMAN, of Brooklyn, New York, have invented an Improved Process of Extracting Gold from Ores and other Auriferous Substances, of which the following is a specification.

In the extraction of gold from ores or other auriferous substances by bromine a larger quantity of bromine must be employed than is necessary to combine with the gold. There are always present in the ore many other elements which combine with the bromine, so that the use of an excess of this element becomes imperative to economically extract the gold. An excess of bromine attacks and dissolves the gold very quickly, and this is an important feature in the treatment of gold-bearing ores. Unless, therefore, means are provided to prevent the loss of the bromine and to regenerate it from its combinations the process would become too expensive and therefore practically prohibitive.

The object of my invention is to extract the gold from ores by the use of an excess of bromine and to regenerate the bromine.

In the accompanying drawings, Figure 1 is an elevation, partly in section, of an apparatus for carrying my invention into effect. Fig. 2 is a similar view of a modification.

The pulverized ore is mixed with water and is thrown into a revolving cylinder $a$. I then add from three to twenty pounds of bromine to each ton of ore, or as much as may be necessary to speedily dissolve the gold. The cylinder is closed and is revolved for about one to two hours, when all the gold will be found in solution. The ore is then thoroughly leached by water and the filtered solution is run through pipe $b$, into a separating-tank or still $c$, which can be hermetically closed. A pipe $d$ leads from the top of this tank to a condenser $e$, which is filled with cold water or other cooling medium. A second pipe $g$ opens into the lower part of tank $c$ and is adapted to feed live steam from a suitable generator $h$ into the body of the solution beneath the surface thereof. The steam is admitted at a temperature of about 250° Fahrenheit. It will raise the temperature of the solution to the boiling-point to vaporize the bromine, and as it ebulliates through the solution it will become charged with the bromine vapors. The charged steam will rush into the condenser $e$, and thus by its own suction will draw practically all the vaporized bromine with it to effect a thorough and rapid separation of the bromine from the solution. Within the coil of the condenser the steam as well as the bromine vapors become condensed into water and liquid bromine, and as these two liquids are of different specific gravity they will become separated. The heavier bromine will settle upon the bottom of the receiver $f$, while the water slightly charged with the bromine will float on top. The bromine thus properly regenerated may now be used over again. If other elements have been present in the ore with which the bromine has combined, the solution in tank $c$ will contain such of them as are soluble in water. To split up these combinations and to set the bromine free, I introduce chlorine into the solution through pipe $i$. This chlorine may be introduced simultaneously with the steam and will displace the bromine from its combinations. The liberated bromine vapors are, of course, carried through the condenser and collected in the receiver $f$. The chlorine is shown to be drawn from a cylinder $j$; but it may, of course, be generated or introduced in a different manner. After all the bromine vapors have been expelled from tank $c$ the steam is turned off and the gold solution is allowed to run through tap $k$ into a precipitating-tank, where the gold may be precipitated in any manner. If desired, the cylinder $a$ may be directly connected with the condenser $e$ and with the steam and chlorine pipes, Fig. 2. In this case the cylinder $a$ will itself constitute the still and the tank $c$ may be dispensed with.

What I claim is—

1. The process of extracting gold from ores and other auriferous substances and regaining the solvent, which consists in dissolving the gold by an excess of bromine, forcing steam into the solution beneath the surface thereof, to vaporize the bromine and charge the ebullient steam with such vapors, drawing the bromine vapors by the steam into a condenser, and there liquefying both the steam and bromine, substantially as specified.

2. The process of extracting gold from ores and other auriferous substances which consists in dissolving the gold by bromine, adding chlorine to the solution and separating the liberated bromine by distillation, substantially as specified.

BERTRAND C. HINMAN.

Witnesses:
F. v. BRIESEN,
WILLIAM SCHULZ.